(12) United States Patent
Torres

(10) Patent No.: US 10,354,302 B2
(45) Date of Patent: Jul. 16, 2019

(54) METHODS AND DEVICES FOR PROVIDING FASHION ADVICE

(76) Inventor: Joreida Eugenia Torres, Washington, DC (US)

( * ) Notice: Subject to any disclaimer, the term of this patent is extended or adjusted under 35 U.S.C. 154(b) by 1485 days.

(21) Appl. No.: 12/805,871

(22) Filed: Aug. 23, 2010

(65) Prior Publication Data

US 2011/0047046 A1 Feb. 24, 2011

Related U.S. Application Data

(60) Provisional application No. 61/236,112, filed on Aug. 23, 2009.

(51) Int. Cl.
*G06Q 30/00* (2012.01)
*G06Q 30/06* (2012.01)

(52) U.S. Cl.
CPC ..... *G06Q 30/0603* (2013.01); *G06Q 30/0613* (2013.01)

(58) Field of Classification Search
CPC ................................................ G06Q 30/06–08
USPC .................................. 705/26–27, 26.1–27.2
See application file for complete search history.

(56) References Cited

U.S. PATENT DOCUMENTS

| | | |
|---|---|---|
| 6,661,433 B1 | 12/2003 | Lee |
| 6,665,577 B2 | 12/2003 | Onyshkevych et al. |
| 6,778,185 B1 | 8/2004 | Moroneyl |
| 7,089,216 B2 | 8/2006 | Van Overveld et al. |
| 7,133,740 B1 | 11/2006 | Stenson et al. |
| 7,194,428 B2 | 3/2007 | Wan et al. |
| 7,321,984 B2 | 1/2008 | Fu |
| 7,356,489 B2 | 4/2008 | Illsley et al. |
| 7,496,526 B2 | 2/2009 | Razumov |
| 2002/0045959 A1* | 4/2002 | Van Overveld ................ 700/90 |
| 2003/0050864 A1 | 3/2003 | Trajkovic et al. |
| 2003/0101105 A1 | 5/2003 | Vock |
| 2004/0054752 A1 | 3/2004 | Takagi |
| 2004/0080530 A1 | 4/2004 | Lee |
| 2007/0110298 A1 | 5/2007 | Graepel et al. |
| 2008/0065514 A1 | 3/2008 | Eaton |
| 2008/0222262 A1* | 9/2008 | Oh et al. ..................... 709/206 |
| 2009/0018926 A1 | 1/2009 | Buehlman |
| 2009/0094260 A1* | 4/2009 | Cheng et al. ................ 707/100 |
| 2009/0315893 A1* | 12/2009 | Smith et al. ................ 345/473 |
| 2010/0191770 A1 | 7/2010 | Cho et al. |

FOREIGN PATENT DOCUMENTS

| | | | |
|---|---|---|---|
| EP | 1372092 | 6/2002 | |
| JP | 2003049309 | 8/2001 | |
| KR | 20010107395 A | 7/2001 | ............. G06F 17/60 |
| WO | WO2008142909 | 5/2007 | |

* cited by examiner

*Primary Examiner* — Ethan D Civan
(74) *Attorney, Agent, or Firm* — Capitol Patent & Trademark Law Firm, PLLC; John Curtin

(57) ABSTRACT

Fashion advice is easily and readily made available using a fashion application or "tool". The advice may be based on stored images of a user's wardrobe and/or from images retrieved from clothing retailers. The advice may be communicated to the user via one or more fashion avatars, or by a linked fashion consultant or through the users involvement in virtual fashion shows.

31 Claims, 3 Drawing Sheets

METHODS AND DEVICES FOR PROVIDING FASHION ADVICE

1. RELATED APPLICATION

This application is related to, and claims the benefit of priority from, U.S. Provisional Application No. 61/236,112 filed Aug. 23, 2009 the contents of which are incorporated by reference herein, as if set forth in full herein.

II. BACKGROUND OF THE INVENTION

In this modern era, our ability to quickly and effortlessly make fashion decisions is limited by our lack of personal time. Yet, we are universally judged by our outward appearance on a daily basis. This conundrum plagues people of all ages, backgrounds, shapes and sizes. Countless methods have attempted to alleviate this problem. Even the craftiest ideas have failed to appeal to the masses, or offer any realistic solutions. From cumbersome website processes to unrefined intelligence systems, the propensity for false hopes has left a wide opening for an authentic, fashion advice application or tool (interchangeably referred to as "application" or "tool" for short).

III. BRIEF DESCRIPTION OF THE DRAWINGS

IV. SUMMARY OF THE INVENTION

Figure 1:
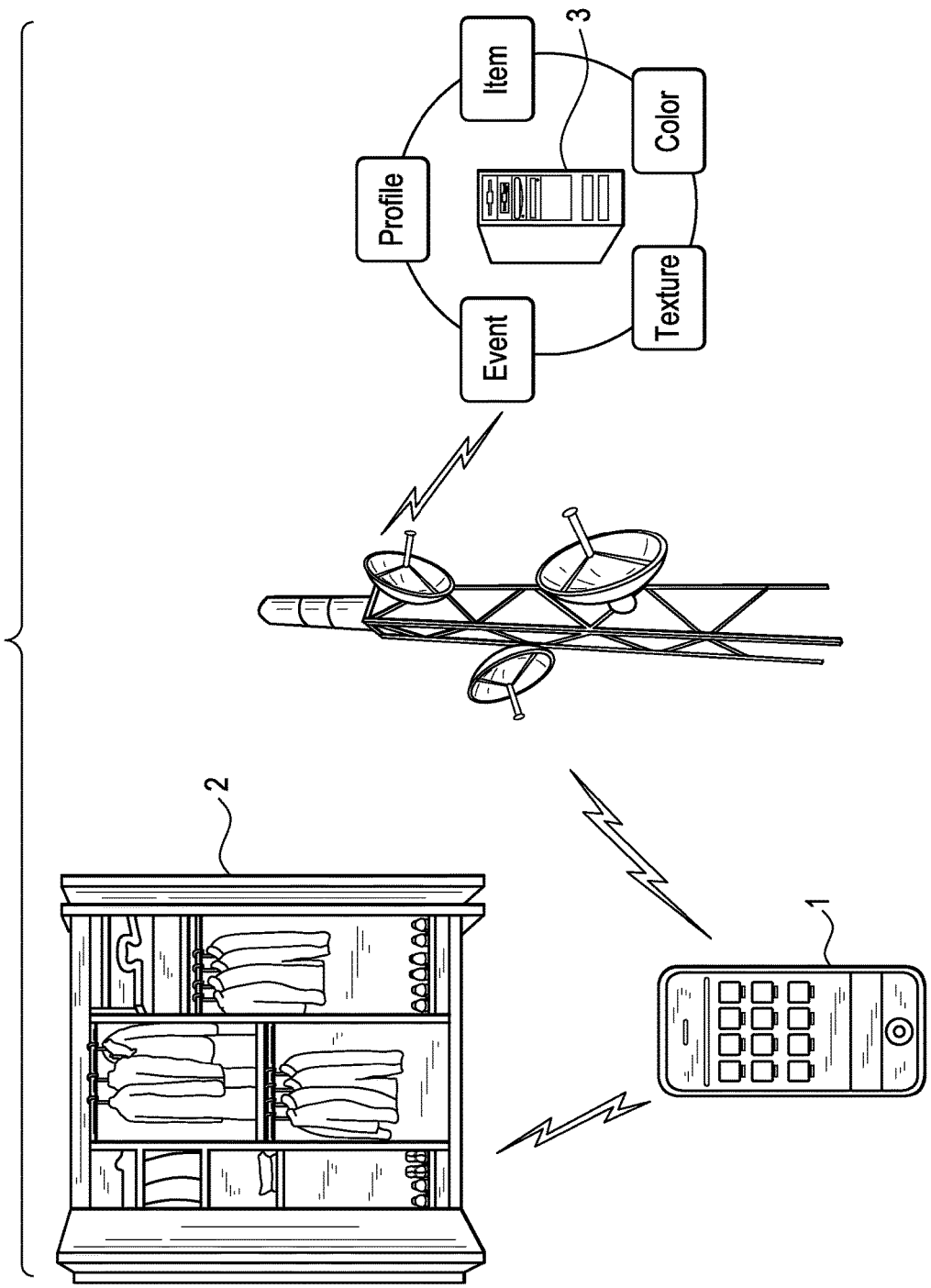
FIG. 1 depicts exemplary elements which may be used to save a personal wardrobe and develop profiles used in generating fashion industry-based recommendations and advice according to embodiments of the invention.

The present invention provides solutions to every person's fashion dilemmas. Regardless of age, or other personal factors, the inventive techniques discussed herein, including a novel application/tool, are designed to make a difference in how people present themselves to the world. In one embodiment of the invention, an inventive tool takes the guesswork out of finding a coordinated outfit thereby saving time, energy and effort. In one embodiment of the invention the tool may comprise a Dress McTM iphone® application or tool (again, the words "application" and "tool" will be used interchangeably herein).

The application may consist of a tailored set of fashion standards that have been created by the inventor and applied by instructions stored on the combination of one or more processors and/or memories making up the application. The standards may be updated on a seasonal basis. The application may also generate personal clothing recommendations that are based on a series of "if"/"then" scenarios based on built-in fashion criteria. For example, "if" a user is wearing a brown belt "then" a user can wear brown shoes. The application may generate thousands of such recommendations based on thousands of if/then scenarios. Users have the ability to control various search criteria, such as, but not limited to, weather and social occasions.

The tool gives users the ability to input basic profile information about articles of clothing/accessories and other fashion-related items in order to create and compile a mobile wardrobe inventory. Each personalized compilation may, thereafter, be 'accepted' by the user and then saved as an approved outfit. This allows users to build user-approved wardrobe inventories that can be accessed by a user at any time. The tool may be part of one or more devices that implement one or more methods, such as: a method for generating personal clothing selections comprising storing an image of a clothing item and the like, analyzing the image and storing and processing characteristics of the item. The method may further comprise storing a personal profile of a user, the profile comprising the user's preferred fashion style, and generating and storing a fashion avatar. The fashion avatar may represent the user's image and likeness along with a fashion recommendation, a fictitious entity, and/or may interact with a user of the device/tool to provide the user with fashion advice. In addition the avatar may provide advice related to employment interviews, dating and/or may interact with the user on a social basis. The method may yet additionally comprise manipulating a newly generated and outfitted avatar. The images of clothing items and the like may originate from a camera or from a website of a clothing retailer, for example. The method may further comprise the generation of a wardrobe recommendation. In alternative embodiments, the method comprises establishing communications with: (1) a fashion consultant; (2) a third party website to enable a user to purchase an item not presently a part of the user's wardrobe; and/or (3) with a virtual fashion world that interacts with a user, where the fashion world may include a virtual fashion show. In still further embodiments of the invention, the method may comprise associating an item with future dates related to future virtual fashion shows that are hosted by real-time judges and broadcast to multiple outlets; such as (but not limited to) TV, internet and mobile networks.

The inventive applications, tools, computer readable mediums (e.g., memory and processors) and related devices and methods provided by the present invention and described herein are designed to make our lives easier. Frustration and resignation are no longer necessary in our daily routine. People can take pride in how they appear to themselves, loved ones, communities and organizations.

V. DETAILED DESCRIPTIONS OF THE INVENTION

Referring now to FIG. 1, there are depicted exemplary elements used in one embodiment of the invention. To begin a fashion recommendation process, a user may access a wireless or wired device 1, such as an iphone®, and use its installed camera or other imaging component to take pictures of clothing items in their wardrobe. Additionally, the user may choose to input items from an existing photo gallery 2. The user may input the items into one or more sections of the application that are stored on the mobile device. Once the items are input the user may indicate or otherwise input specific clothing characteristics through multiple-choice selections using the input interfaces included in the device 1, such as a keypad, touch screen, or audio section to give just a few examples. It should be understood that the device 1 comprises an image storage section for storing the input pictures, photos or images (collectively "images") of clothing items and an image processing section for processing and/or otherwise manipulating the stored images. The image processing section may further include, for example, image and pattern recognition sections operable to analyze inputted and/or stored images representing items in order to, for example, categorize the items (see below). Similarly, the device 1 comprises memory and processing sections for storing and processing the characteristics of each item input by the user. Together, each of these sections comprises a part of the inventive fashion tool or application provided by the present invention.

Before going further, while the example above makes use of the fashion application as an embedded application residing within a single device, it should be understood that one or more sections or components of the fashion application may reside on a different device 3, such as an internal/external network server, or wireless access point, to name just a few examples. Further, it should be understood that one or more of the components or sections of the fashion application (e.g., image processing section, image storage section, characteristic storage and processing sections, as well as other sections mentioned herein) may comprise hardware, software, firmware or some combination of the three. When comprised of software or firmware, these components may comprise instructions stored on computer readable/writable medium, such as one or more processors used in conjunction with one or more memories and the like, for implementing a particular function or functions. Further, it should be understood that the completion of a particular function, such as image processing, necessarily involves a transformation of data from one form to another. Yet further, the inventions disclosed and claimed herein are not simply abstract ideas, disembodied mental processes (i.e., the processes are related to real world data) or fundamental scientific principles.

User information inputted into the application may be sent via a network, such as a broadband mobile Internet, and stored in an external server 3 or the like. The user's complete wardrobe may reside on the external server 3 and be easily accessed through the fashion application.

Figure 2:
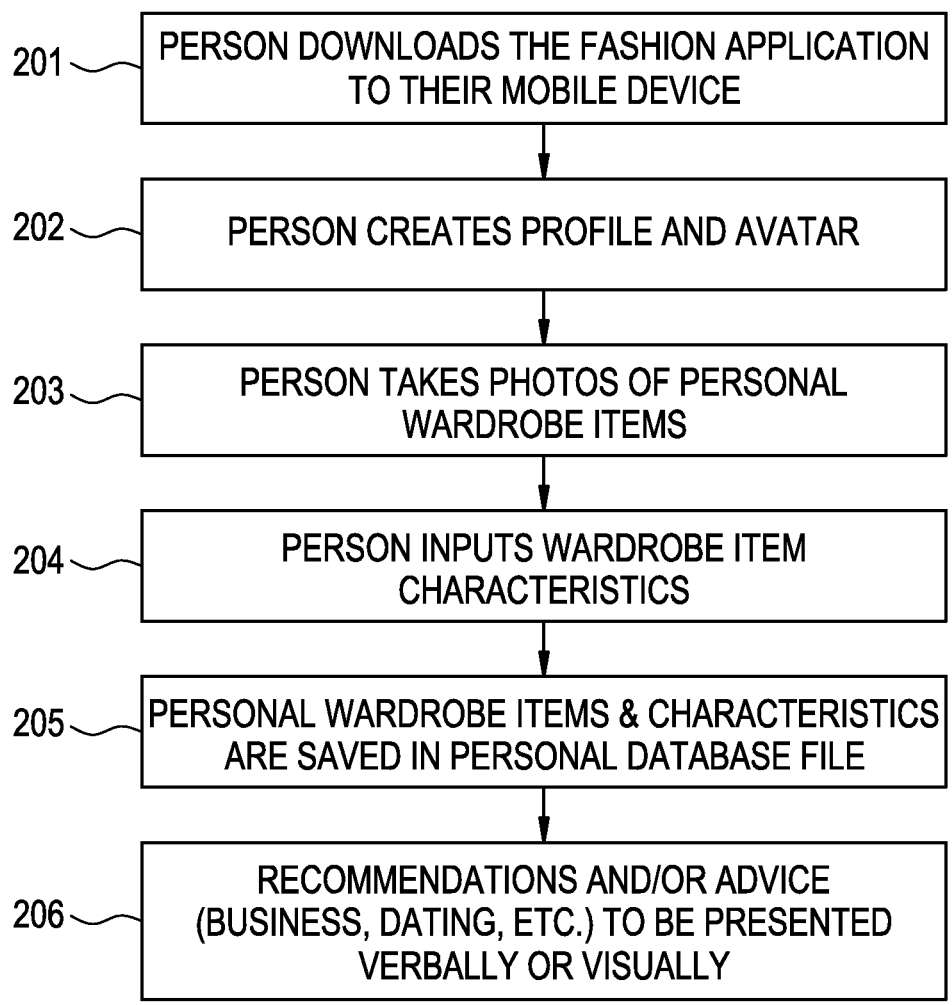
FIG. 2 depicts an exemplary method by which a person downloads, inputs or stores their personal items to a device that includes an inventive application and creates a profile that feeds into the application's automated fashion recommendations, according to embodiments of the invention.

Referring now to FIG. 2, there is depicted a process by which a person inputs personal items to a fashion application stored on a device 1, such as a mobile device, and creates a profile that feeds into the application's automated fashion recommendation section/component, according to one embodiment of the invention.

As shown, in step 201, a user may load the fashion application on a mobile device 1 or another type of smartphone or portable device (e.g., iPad®). Thereafter, the application may be selected and installed from a list of available programs that can be operated on the device 1.

In step 202, the user selects the application and is prompted to respond to a series of questions to create a personal profile for the user. A personal profile section of the 1 device may be operable to store the profile as well as other data created by the user. For example, the user may enter name, age, location and preferred fashion style. Once basic data is entered, the user may create a fashion avatar. More specifically the image processing section (as well as other sections of the device 1) may be operable to assist a personal profile section in generating one or more fashion avatars. The avatar may represent the user's image and likeness, be a fictitious manifestation of an entity, or be a combination of the two. For example, the user can select to apply his/her face to the avatar, but can also select purple hair as a feature. The avatar may depict fashion recommendations, unless the user disables this feature and opts to simply use the application's wardrobe inventory function. The avatar may also be stored within the personal profile section. The fashion avatar may interact with the user to provide the user with fashion advice based, for example, on the user's body type. The avatar may also provide advice related to other related issues, such as employment interviews, dating and otherwise interact with the user on a social basis (e.g., engage in conversations with the user, including humor) in one or more languages and/or regional accents. In an alternative embodiment, if the user decides to create a fashion avatar in their own image and likeness the user may take a photograph of herself/himself or otherwise create such an image while, for example, wearing only undergarments and the like.

In step 203, the user may optionally input images of groups or individual articles of clothing/accessories ("items") by inputting the images to the application via an associated camera or the like. The images must be taken with adequate lighting and may be unfolded and fully displayed. Alternatively, the images may originate from websites or printed material (e.g., advertisements) published or otherwise made available by third party businesses, such as clothing retailers (e.g., Nordstrom's, Macy's, WalMart, etc.).

In step 204, the application may prompt the user to respond to a series of questions concerning the characteristics of the items after each image is input (i.e., categorization). For example, if the user chooses to upload 'shirts' the user may need to indicate which characteristics apply to their shirts. The user can select other characteristics such as pattern, color, style, size/length, for example. Additionally, some user responses and/or selections may prompt additional questions (e.g., type of pattern).

The clothing/accessory characteristics may be added to a user's personal wardrobe inventory, which maybe stored on the device 1 or another device 3, such as an external server, without further prompting of the user (i.e., automatically).

The application may include a recommendation section that has access to all of the other sections in order to generate wardrobe (i.e., one or more items) and other fashion-related recommendations. A recommendation may be provided to the user via a visual display or another output device (e.g., audio output, textual output). This section may also prompt the user to determine whether the user wishes to proceed with a specified recommendation. Alternatively, the application may prompt the user to indicate whether the user is selecting a wardrobe or individual item to be worn at a particular event, such as a wedding, employment interview, dating, another social event, etc. . . . Thereafter, the application is operable to provide recommendations to the user that are suitable for an indicated event. When items from third party retail businesses have been input or otherwise been made accessible to the application, the personal profile section may be operable to alert the user when such retail items match a user's preferred fashion style.

Figure 3:
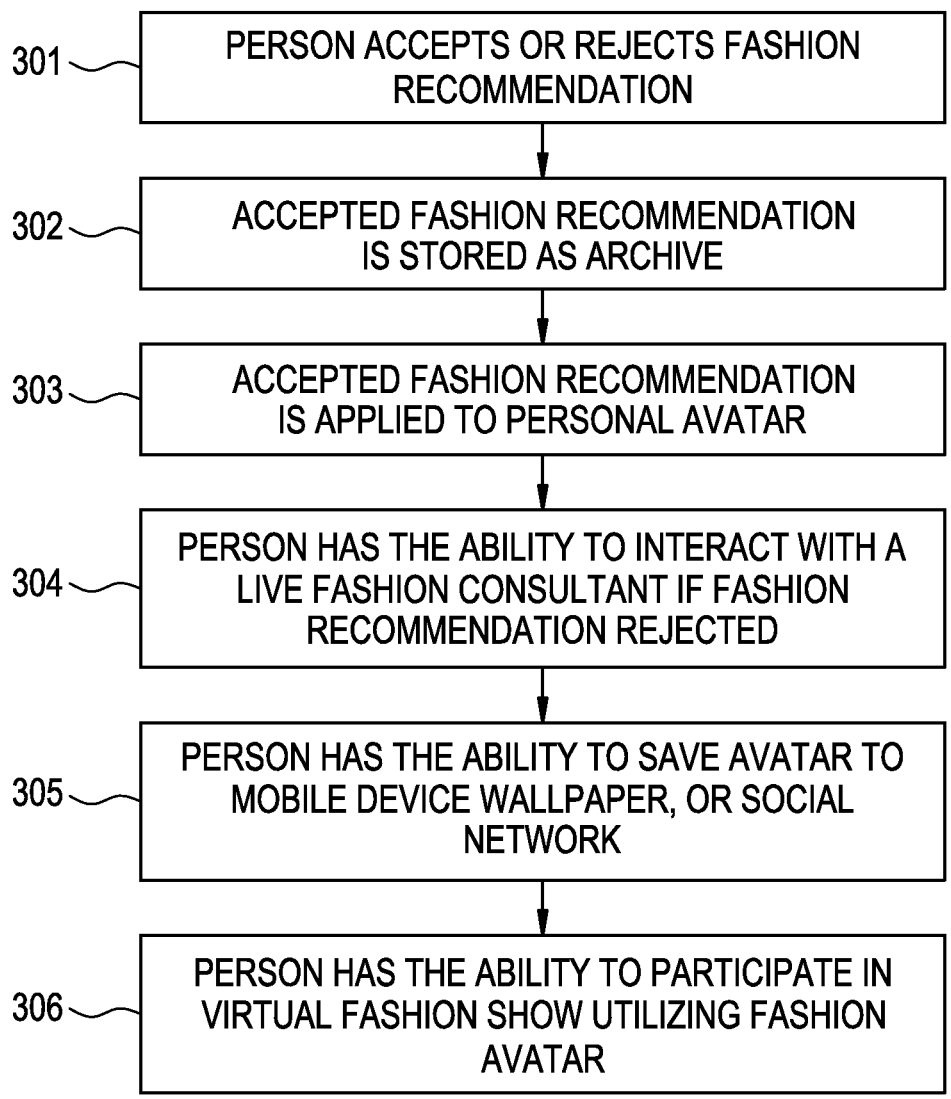
FIG. 3 depicts a process that may be followed once a fashion recommendation has been generated and previewed on an inventive device, according to embodiments of the invention.

Referring now to FIG. 3, there is depicted a method that may be followed after a fashion recommendation is generated and previewed on a device, according to one embodiment of the invention. It should be noted that the steps shown in FIG. 3, and their sequence, are exemplary. A particular user or fashion advice recommendation may follow a different sequence other than the one depicted in FIG. 3.

In step 301, the user may either accept or reject the recommendation using a suitable input mechanism (e.g., keyboard, touch screen, etc. . . . ). If, for example, an outfit included within the wardrobe or item recommendation is acceptable, the recommendation is approved and stored in memory or an archive as historical records for future reference (step 302). If the outfit is unacceptable, the recommendation is rejected and may not be stored. Thereafter, the application may generate an alternative recommendation without further prompting of the user. In an alternative embodiment of the invention, as a part of this process (or another process) before accepting or rejecting a recommendation the user may obtain fashion guidance by emailing or otherwise communicating a recommendation to a certified fashion consultant (e.g., both freelance and via department store). Such guidance may be provided free of charge or for a monetary fee. The device 1 may comprise the necessary communication section for establishing, maintaining and terminating (collectively referred to as "establishing") communications with such a consultant.

In step 303, if the user chooses to continue with the approved recommendation, the outfit (or wardrobe or individual item) associated with the approved recommendation may be virtually presented as a part of an avatar on a display or the like of a device 1. More particularly, in one embodiment of the invention the personal profile section may generate the avatar and control the avatar to interact with the user to provide fashion advice using a number of communication methods, for example, at least one of a group selected from verbal communications, textual communications, visual communications and/or some combination of verbal, textual and visual communications, including sign language for the audibly impaired. The avatar may be a 2-dimensional or 3-dimensional avatar, with and/or without parallax information. In the event a particular recommendation includes one or more items that are not presently a part of the user's wardrobe, the communication section of the device or application may be operable, for example, to establish communications with a third party website to enable the user to purchase such an item from such a website.

In step 304, the application may comprise one or more sections (collectively referred to as "image manipulation section") that function to enable the user to visually manipulate a newly created and outfitted avatar. In one embodiment of the invention, the sections may allow the avatar to be made a part of a display's "wallpaper", used in conjunction with an online web presence, such as MySpace®, or Facebook®—for all to see and appreciate. In yet additional embodiments of the invention, the communications section of the application maybe further operable to establish communications with a virtual fashion world where, for example, celebrity guest judges can interact with the user in order to critique a users outfit and/or to enable users to participate in a virtual fashion show (see step 306). Still further, the application may store historical records in the archive or memory mentioned above that enables the user to track when a particular item or wardrobe was last worn. The historical records may be linked to a calendaring section of the application that is operable to display or otherwise enable the user to visually see one or more of the historical records. Similarly, the calendaring section may allow the user to associate selected items and/or wardrobes with future dates. This may be saved as data as well within the historical records. In step 305, a generated avatar may be stored or saved in a mobile device, for example, as "wallpaper" or within a social network site.

While the discussion above has set forth some non-limiting examples of the present invention, other equivalent techniques, processes and devices may be substituted for those presented. These substituted techniques, processes and devices are also considered within the scope of the present invention.

I claim:
1. A device for generating fashion advice comprising:
  an image storage section for storing an image of a clothing item;
  an image processing section for analyzing the image;
  memory and processing sections for storing and processing characteristics of the item;
  a recommendation section for generating a wardrobe recommendation based on the item and fashion industry standards; and
  a personal profile section for a user, the profile section operable to store a personal profile of a user, the profile comprising the user's preferred fashion style, the personal profile section is further operable to generate a fashion avatar to interact with the user to provide fashion advice.

2. The device as in claim 1 wherein the personal profile section is further operable to alert the user when retail items match a user's preferred fashion style.

3. The device as in claim 1 wherein the personal profiles section is further operable to generate an avatar representing the user's image and likeness and a clothing recommendation.

4. The device as in claim 1 wherein the personal profiles section is further operable to generate an avatar representing a fictitious entity and a clothing recommendation.

5. The device as in claim 1 wherein the personal profile section is further operable to generate the avatar to interact with the user to provide the fashion advice using at least one of the group selected from verbal communications, textual communications, visual communications and some combination of verbal, textual and visual communications.

6. The device as in claim 1 wherein the personal profile section is further operable to generate an avatar that provides advice related to employment interviews.

7. The device as in claim 1 wherein the personal profile section is further operable to generate an avatar that provides advice related to dating.

8. The device as in claim 1 wherein the personal profile section is further operable to generate an avatar that interacts with the user on a social basis.

9. The device as in claim 1 wherein the image originates from a website of a clothing retailer.

10. The device as in claim 1 further comprising a communication section for establishing communications with a fashion consultant.

11. The device as in claim 1 further comprising a communication section for establishing communications with a third party website to enable a user to purchase an item not presently a part of the user's wardrobe.

12. The device as in claim 1 further comprising an image manipulation section for manipulating the avatar.

13. The device as in claim 1 further comprising a communications section for establishing communications with a virtual fashion world that interacts with a user.

14. The device as in claim 13 wherein the virtual fashion world comprises a virtual fashion show.

15. The device as in claim 1 further comprising a calendaring section for associating the item with future dates related to future virtual fashion shows.

16. A method for generating fashion advice comprising:
  storing an image of a clothing item on a network server;
  analyzing the image on the server;
  storing and processing characteristics of the item on the server;
  generating a wardrobe recommendation based on the item and fashion industry standards on the server; and generating a fashion avatar on the server that interacts with a user to provide the user with fashion advice.

17. The method as in claim 16 further comprising storing a personal profile of a user on the server, the profile comprising the user's preferred fashion style.

18. The method as in claim 17 further comprising alerting the user when retail items match a user's preferred fashion style.

19. The method as in claim 17 further comprising generating an avatar representing the user's image and likeness and a clothing recommendation on the server.

20. The method as in claim 17 further comprising generating an avatar representing a fictitious entity and a clothing recommendation on the server.

21. The method as in claim 17 further comprising generating an avatar that provides advice related to employment interviews on the server.

22. The method as in claim 17 further comprising generating an avatar that provides advice related to dating on the server.

23. The method as in claim 17 further comprising generating an avatar that interacts with the user on a social basis on the server.

24. The method as in claim 16 further comprising generating the avatar to interact with the user to provide the fashion advice on the server using at least one of the group selected from verbal communications, textual communications, visual communications and some combination of verbal, textual and visual communications.

25. The method as in claim 16 wherein the image originates from a website of a clothing retailer.

26. The method as in claim 16 further comprising establishing communications with a fashion consultant.

27. The method as in claim 16 further comprising establishing communications with a third party website to enable a user to purchase an item not presently a part of the user's wardrobe.

28. The method as in claim 16 further comprising manipulating the avatar.

29. The method as in claim 16 further comprising establishing communications with a virtual fashion world that interacts with a user.

30. The method as in claim 16 wherein the virtual fashion world comprises a virtual fashion show.

31. The method as in claim 16 further comprising associating the item with future dates related to future virtual fashion shows.

\* \* \* \* \*